Patented Nov. 14, 1944

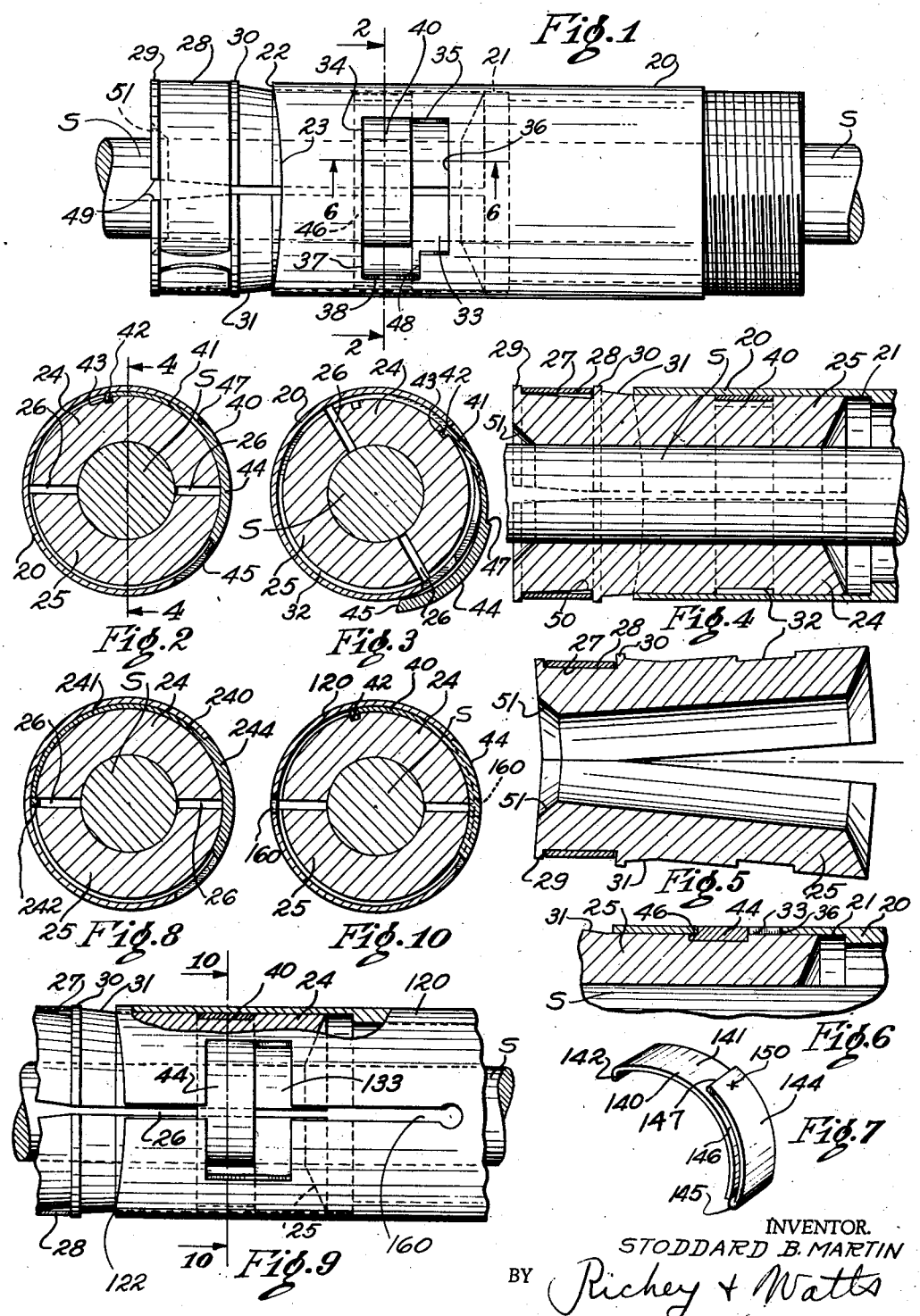

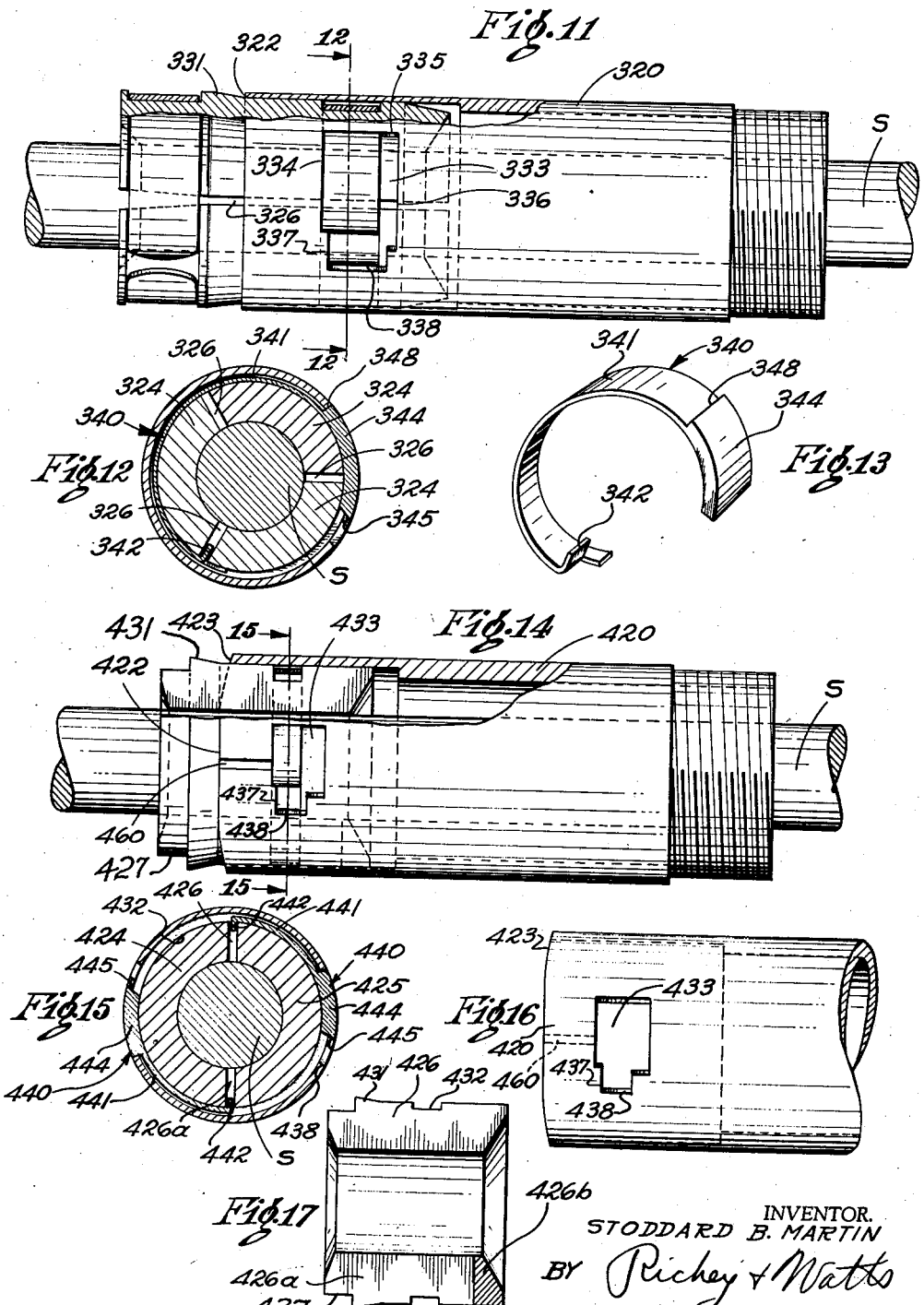

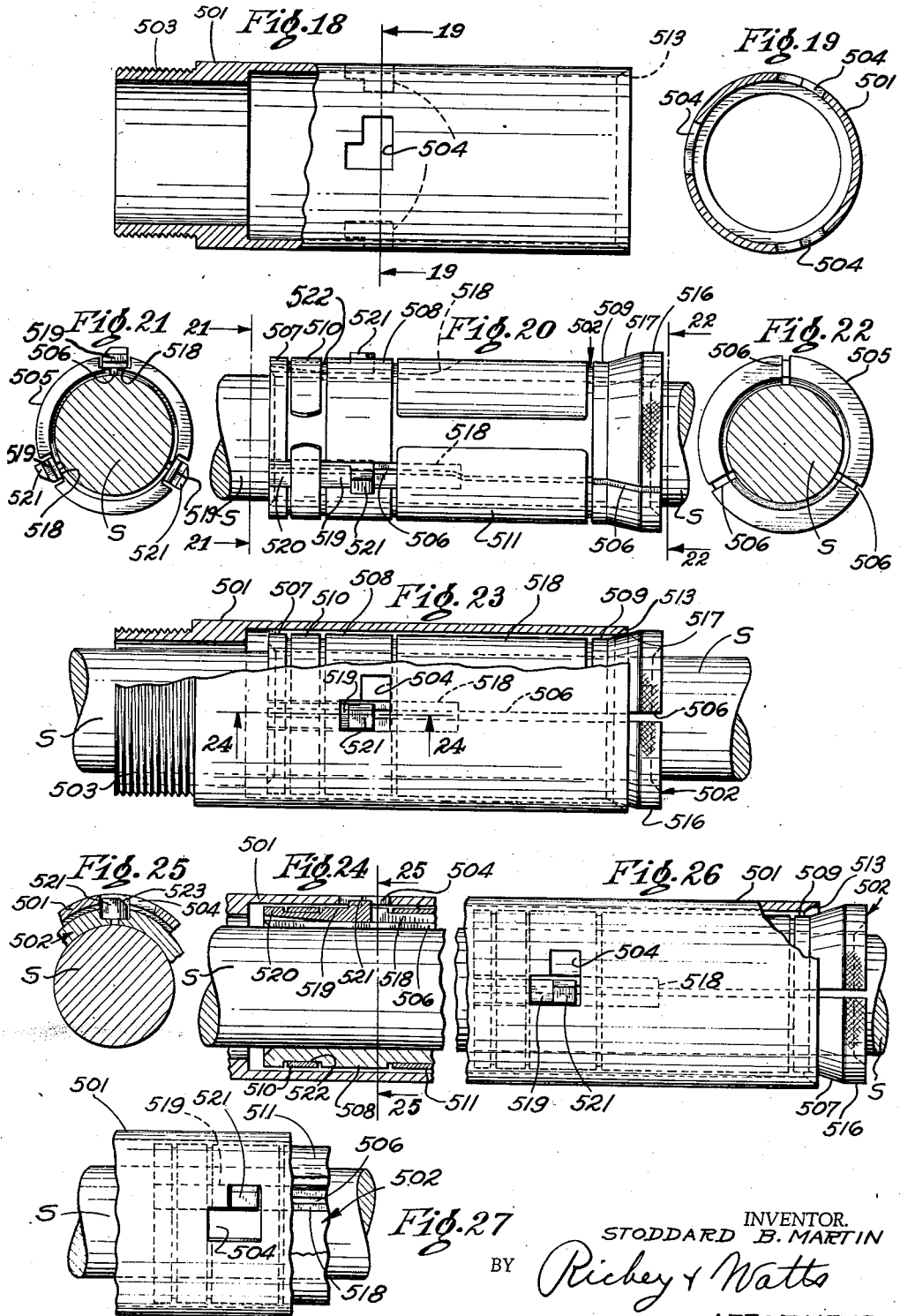

2,362,494

UNITED STATES PATENT OFFICE 2,362,494

PUSHER

Stoddard B. Martin, Cleveland, Ohio

Application June 12, 1942, Serial No. 446,754

15 Claims. (Cl. 29—62)

This invention relates to improvements in stock feed fingers or pushers of the type employed in automatic screw machines.

Each spindle of an automatic screw machine ordinarily surrounds a rotating collet tube having a collet at its forward end which is arranged to be compressed radially to grip and rotate a bar of stock fed axially through the tube. At the end of each cycle of operation the projecting end of stock is cut off from the bar, whereupon the collet opens and a new length of stock is fed forwardly and the collet is again closed to grip the stock and repeat the cycle of operation. The stock is ordinarily fed forward by a pusher carried by a reciprocating pusher tube arranged between and coaxial with the collet tube and the bar of stock.

In the conventional machine the pusher is simply a spring bushing exerting a constant grip on the bar of stock which is moved forwardly after the collet opens until the forward end of the bar strikes a stock gauge. The collet then grips the bar and the pusher is retracted. One of the disadvantages of this arrangement is that when the pusher is given a sufficiently tight grip on the bar to insure accurate feeding and prevent rebounding when the bar strokes the gauge, there is danger of scratching or scoring the stock when the pusher is retracted. Another disadvantage of such an arrangement is that the pusher exerts a constant grip on the bar stock during both the feeding and return strokes so that the gripping surfaces of the pusher are rapidly worn out by the friction of the return strokes.

To avoid these disadvantages it has been proposed to provide one way grippers which by a wedging or similar action grip the bar tightly on the forward feeding stroke and release it, or grip it but lightly, on the return stroke. Pushers of this type are disclosed in my prior Patents Nos. 2,088,067, 2,169,107, 2,187,089, and 2,187,090, and in my co-pending application Serial No. 387,476, filed April 8, 1941, now Patent No. 2,323,067, dated June 29, 1943, and applications Serial No. 390,601, filed April 26, 1941, and Serial No. 406,268, filed August 11, 1941.

It has also been proposed to construct such pushers as master pushers. The gripping surfaces that engage the stock are provided with a bushing removable from the pusher shell, so that a bushing with the desired sized opening may be positioned in the shell of the pusher to accommodate any particular size of stock without substituting an entire pusher or feeding finger as has been customary in conventional machines. Such master pushers are of but limited utility unless the construction is sufficiently compact and simple to permit the same to be used to feed stock of the maximum capacity of the machine, in addition to smaller sizes of stock.

One of the difficulties heretofore encountered in connection with master pushers having a one-way gripping action arises from the fact that it is occasionally necessary to withdraw the bar being worked upon from the machine. In pushers in which the gripping action is increased by wedging means and the like on the feeding stroke, it is necessary to provide means to prevent the wedging or tight gripping action when the bar is withdrawn. The provision of such means in addition to the wedging means not only increases the cost, and complexity of the device, but adds to the difficulty of maintaining it sufficiently compact to permit the same pusher to handle all sizes of stock up to and including the maximum capacity of the machine.

The present invention relates particularly to the subject matter disclosed in my co-pending application Serial No. 390,601, filed April 26, 1941, of which this application is in part a continuation.

The principal objects of this invention are to arrange within the thickness of the wall of the shell of the pusher a suitable abutment means to pull the bushing on its retracting stroke in a master pusher of this type; to combine a wedging means to increase the grip of the bushing on the stock on the feeding stroke which is arranged within the radial extent of the shell wall with retracting abutments which are also disposed within the thickness of the shell wall, so as to minimize the necesary radial thickness of the entire pusher to accommodate stock of the maximum capacity of the machine; and to maintain the retracting abutments in engagement with each other at all times, whether or not there is a bar of stock disposed within the bushing.

Another object of the present invention is to simplify and improve the construction of master pushers of this type in which removable bushings of the desired size are held in place in a pusher shell so that a tight gripping force is exerted on the stock during the feeding movement of the pusher and a relatively light force is applied during the retracting stroke, the pusher including readily manipulable means to prevent the application of the tight gripping force, when desired, to permit withdrawal of the bar of stock. Other objects are to simplify and cheapen the construction of the bushing so that the same may be readily installed and removed; to dispose the operative parts of the bushing in a relatively shallow depth to permit the use of a bushing having adequate strength and bearing areas for stock of the maximum capacity of the machine, and to arrange the means for preventing the application of the tight gripping force during withdrawal of the bar of stock in such a manner as to prevent its accidental application from over-running of the pusher shell after the collet has opened at the beginning of the feeding stroke. Other objects and advantages will appear in the following detailed description of prefered embodiments of the invention.

In the accompanying drawings:

Fig. 1 is a side elevation of one form of pusher embodying this invention;

Fig. 2 is a section taken on the line 2—2 of Fig. 1;

Fig. 3 is a section corresponding to Fig. 2 but showing the position of the parts during assembly of a bushing in the pusher shell;

Fig. 4 is a longitudinal section through the assembled pusher taken on the plane indicated by the line 4—4 of Fig. 2;

Fig. 5 is a longitudinal section through the bushing of Fig. 4 removed from the pusher shell, the relation of the parts being exaggerated to illustrate the action;

Fig. 6 is a detail sectional view taken on the line 6—6 of Fig. 1;

Fig. 7 is a perspective view of one form of locking key suitable for use with any of the modifications illustrated;

Fig. 8 is a section corresponding to Fig. 2 showing a slight modification in the arrangement of the locking key;

Fig. 9 is a side elevation corresponding to Fig. 1 illustrating a modification in the construction of the pusher shell;

Fig. 10 is a cross section taken on the line 10—10 of Fig. 9;

Fig. 11 is a side elevational view of a further modification embodying a bushing split three ways;

Fig. 12 is a section on the line 12—12 of Fig. 11;

Fig. 13 is a section of the locking key of Figs. 11 and 12;

Fig. 14 is a side elevation partly in section of a further modification of the invention;

Fig. 15 is a cross section taken on the line 15—15 of Fig. 14;

Fig. 16 is a view of the opposite side of the shell shown in Fig. 14;

Fig. 17 is a longitudinal section through the bushing shown in Figs. 14 and 15.

Fig. 18 is a view partly in section and partly in elevation of a shell of a further modified form of the invention;

Fig. 19 is a cross-section taken substantially on the line 19—19 of Fig. 18;

Fig. 20 is a side elevation of a bushing to cooperate with the shell shown in Fig. 18;

Fig. 21 is an end view of the bushing looking in the direction of the arrows 21—21 of Fig. 20;

Fig. 22 is a view of the opposite end looking in the direction of the arrows 22—22 of Fig. 20;

Fig. 23 is a view partly in elevation and partly in section of the shell and bushing assembled with the wedging surfaces engaged to tightly grip the stock;

Fig. 24 is a partial longitudinal section taken substantially on the line 24—24 on Fig. 23 looking in the direction of the arrows;

Fig. 25 is a cross-section taken substantially on the line 25—25 of Fig. 24 looking in the direction of the arrows;

Fig. 26 is a side elevation of the assembled pusher with a part of the shell broken away showing the wedging surfaces out of engagement; and Fig. 27 is a partial side elevation corresponding to Fig. 26 but showing the bushing turned to prevent engagement of the wedging surfaces.

Referring first to the construction shown in Figs. 1 to 6, the improved pusher includes a shell 20 arranged to be secured to the forward end of the pusher tube of an automatic screw machine or the like. The thickness of the shell is reduced near its forward end by a counter bore 21 and the shell terminates in a forward wedging end 22 cut back slightly on opposite sides as indicated at 23.

A tubular bushing is cut longitudinally through its length and through the thickness of its opposite sides forming two semi-cylindrical members 24 and 25 separated by oppositely disposed splits 26. Near its forward end a shallow groove 27 is turned in the bushing to receive a spring 28. Shoulders 29 and 30 at the opposite sides of the groove serve to retain the spring in position. Rearwardly from the shoulder 30 the outer wall of the bushing is reduced in a conical shape 31 forming a wedging surface adapted to co-act with the forward wedging edge 22 of the shell to increase the grip of the bushing on the stock. To the rear of the conical surface 31 a shallow groove 32 is turned in the exterior surface of the bushing.

The shell 20 is formed on one side with an opening 33 defined by a rearwardly facing straight edge 34, an axially extending straight side edge 35, a forwardly facing edge 36 and a notch 37 terminating in a beveled edge 38, the notch 37 being aligned with the rearwardly facing edge 34 and having a forwardly facing edge 48 spaced from the edge 36.

A key 40 is arranged to lock the bushing in the shell. In the form illustrated in the Figs. 1 to 6 inclusive the key 40 is made from resilient or yieldable material and includes an arcuate portion 41, having a thickness substantially equal to the depth of the groove 32 turned in the circumference of the bushing, and terminating in an inwardly turned end 42. A slot 43 is formed in the bushing section 24 across the groove 32 to receive the inwardly turned end 42 of the key 40.

The opposite end of the key 40 consists of an arcuate thickened portion 44 having a thickness substantially equal to the depth of the groove 32 plus the thickness of the wall of the shell 20. The portion 44 terminates in a beveled edge 45. Preferably the thickened portion 44 is formed along its forward side edge with a narrow ledge 46 of the same thickness as the portion 41, as illustrated in Figs. 1 and 6.

The bushing is assembled within the shell by simply pushing it axially into the open end of the shell with the slot 43 turned to be exposed through the opening 33. The inwardly turned end 42 of the key 40 is then seated in the slot 43, as illustrated in Fig. 3, and the bushing is turned in a counter-clockwise direction to draw the thin portion 41 of the key under the wall of the shell 20.

When the beveled end 45 of the thickened portion 44 of the key passes the beveled edge 38 of the opening in the shell, the entire key snaps into the groove 32 in the bushing. The thickened portion 44 of the key is then disposed wholly within the opening 33 in the shell. As the rotation of the bushing is continued the shoulder 47, formed at the junction of the thickened portion 44 with the thin portion 41 of the key, engages the side edge 35 of the opening 33 and prevents further rotation in a counter-clockwise direction. The parts are then in the position illustrated in Fig. 2.

In operation, the stock is normally rotated in a counter-clockwise direction when the collet carried by the spindle grips the stock. When the collet opens, the pusher tube is moved forwardly, or to the left as seen in Fig. 1, to advance a new length of stock S through the collet. As the shell 20 moves to the left the right hand portion of the opening 33 moves to the left with respect to the bushing until the key 40 enters the right hand end of the opening 33. The advancing motion of the shell causes the end 22 of the shell to engage the taper 31, increasing the grip of the bushing upon the stock and causing the bushing, and therefore the stock, to move forward with the pusher tube. With the bushing of the type illustrated, divided into two parts by the splits 26, the parts are arranged so that when the shoulder 47 is in its normal position in abutment with the side edge 35 of the opening in the shell, the wedging force is first applied to the bushing on the diametrical plane perpendicular to the plane defined by the splits 26. The forward edge of the shell is cut back slightly, as indicated at 23, on each side between the ends of the diameter perpendicular to the plane of the splits 26 so that these cut back portions do not engage the wedging surface 31 until after considerable pressure has been applied by the projecting portions of the forward edge 22.

At the completion of the feeding stroke the stock is again gripped by the collet and the pusher tube is retracted. The retracting movement of the shell 20 causes it to slide rearwardly, or to the right as illustrated in Fig. 1, with respect to the bushing, until the rearwardly facing edge 34 of the opening 33 passes over the ledge 46 on the key 40, and engages the forward edge of the thickened portion 44 of the key. Since the key is seated in the annular groove 32, and the thickened portion 44 spans one of the splits 26, the retracting movement of the shell 20 is then transmitted to both sections 24 and 25 of the bushing. The initial portion of the retracting movement of the shell 20 releases the wedging pressure applied by the engagement of the edge of the shell 22 with the wedging surface 31 so that the bushing engages the stock with only the relatively light grip provided by the spring 28, and thus there is no danger of marring the stock while the bushing slides over it on the retracting stroke.

When it is desired to remove the bar of stock from the machine, it is only necessary to effect relative rotation between the bushing and the shell in the direction opposite to the normal rotation so that the thickened portion 44 of the key 40 enters the notch 37 in the opening 33. The bar may then be pulled rearwardly and the engagement of the thickened portion 44 of the key with the forwardly facing edge 48 of the notch 37 prevents the bushing from moving rearwardly in the shell a sufficient distance to cause engagement between the forward edge 22 of the shell and the beveled surface 31 of the bushing. Thus the bar may be pulled out of the machine against the friction provided by the spring 28 without danger of the wedging action gripping the bar so as to prevent such withdrawal.

This relative rotation of the bushing and shell to position the key in the notch 37 may be effected by simply grasping the stock and turning it in the direction opposite to the normal direction of rotation. In case the friction between the parts is sufficient to make it difficult to turn the bar by hand, the collet may be closed on the stock so as to hold it against rotation, and the pusher tube rotated by a spanner wrench or the like engaging its rearward end to bring the key into the notch. In case there is sufficient friction to prevent a straight withdrawal of the bar from the pusher tube, the pusher tube and bar may be slammed rearwardly until the pusher tube engages the stop at the rear end of the machine so that the bar continues to move rearwardly by its own inertia.

When it is desired to remove the bushing from the shell 20, the pusher tube is first removed from the spindle and the projecting end of the bushing is rotated in a clockwise direction until the beveled edge 45 of the key 40 engages the beveled edge 38 of the opening 33. Continued rotation of the bushing with respect to the shell causes the beveled end 45 of the key to ride over the beveled edge 38 on the shell so that the key is forced to the outside of the shell. As soon as the bushing has been rotated far enough to bring the groove 43 into alignment with the opening 33, the key 40 drops out and the bushing may be pulled forwardly out of the shell 20.

The splits 26 which divide the bushing into the two parts 24 and 25 are preferably flared out slightly at the forward end of the bushing through about the axial length of the groove 27, as illustrated at 49. Likewise the groove 27 is preferably formed slightly deeper at its rear edge than at its forward edge, as illustrated at 50. Thus when there is no stock within the bushing, the force of the spring 28, instead of closing the splits 26 uniformly through the length of the bushing, tends to collapse the forward end of the bushing and spread the rear end open, as illustrated in Fig. 5. The extent of the flaring of the splits 26 and of the groove 27 is exaggerated in the drawings so as to illustrate the action. This arrangement maintains the thickened portion 44 of the key 40 in position to engage the edges of the opening 33, regardless of whether there is any stock disposed within the bushing. Preferably the forward face of the bushing is formed with a slight bevel 51 leading to the internal bore in the bushing, to make certain that the force of the spring 28 will keep the rear end of the bushing spread outwardly into contact with the shell, even when the extreme end only of a bar is gripped by the bushing near its forward face and no new bar has been fed into the machine. Even though in such circumstances the wedging action on the feeding stroke might first force the rear ends of the bushing sections 24 and 25 together, the action of the spring 27, as soon as the pusher shell 20 starts its retracting stroke, will again force the rear ends of the bushing sections outwardly so that the key 40 is in proper position with respect to the opening 33 in the shell.

Fig. 7 illustrates a key 140 which may be simply and easily manufactured and which may be used in any of the embodiments of the invention. The key 140 is made from a strip of metal, having a thickness equal to the depth of the groove 32, which is cut to form a portion 141 of a width equal to the axial extent of the groove 32, and a slightly narrower portion 144. The narrower portion 144 is then bent through 180° at the point 145, so that the narrower portion 144 overlies the portion 141. The two portions may then be spot-welded together, as indicated at 150, or secured in any other suitable manner. The end of the narrower portion 144 forms the abutment shoulder 147 to limit the rotation of the bushing with respect to the shell, and the bend 145 has sufficient radius to cooperate with the beveled edge 38 in the shell to permit the removal of the key. The edge of the portion 141 which is not covered by the portion 144 forms the ledge 146. The end of the portion 141 opposite the bend 145 is turned downwardly to form the flange 142 to engage in the slot 43 in the bushing.

Another slight modification in the arrangement of the key is illustrated in Fig. 8. In this embodiment the key 240 is formed with a thin portion 241 of sufficient length to permit the down-turned end 242 to engage in one of the splits 26 in the bushing. The entire key is made slightly more than 180° in extent so that the thickened portion 244 spans the other split 26 and thus transmits the retracting motion to both sections 24 and 25 of the bushing as in the embodiment previously described.

A modified construction of the shell is illustrated in Figs. 9 and 10. In this embodiment the shell 120 is formed with two oppositely disposed splits 160 extending axially into the shell from the forward edge thereof, preferably for a greater distance than the length of the bushing disposed within the shell. The two sections of the shell formed by the splits 160 are inwardly tensioned so that the shell normally exerts a spring tension on the bushing and thus on the stock. In this arrangement the spring 28 may be omitted in some instances, since sufficient tension may be obtained from the shell alone. However, when the spring 28 is also used, the flaring of the splits 26 in the bushing, as illustrated at 49, may be omitted since when no stock is disposed within the bushing the shell collapses inwardly with the bushing, retaining the desired relation of the key 40 and the opening 133 at all times. In this form of the invention the shell may be formed simply with a rectangular opening 133 to receive the key 40 without providing a notch to engage the key and hold the wedging surfaces out of engagement. Since the maximum wedging force is limited to a predetermined value the bar may be withdrawn from the machine by pulling or slamming it rearwardly against the friction provided by the maximum gripping force.

Another feature of operation is produced by splitting the shell 120 inwardly from the forward edge 122. The maximum wedging force that can be applied to the bushing is limited by the tension of the shell when it has spread sufficiently to permit the forward edge 122 to contact the shoulder 30 on the bushing. This feature is claimed in my co-pending application Serial No. 390,601, filed April 26, 1941.

A further modification of the invention is illustrated in Figs. 11 to 13. In this embodiment the bushing is divided into three sections 324 by three equally spaced splits 326. The forward edge 322 of the shell 320 is arranged in a plane perpendicular to the axis so as to engage the beveled surface 331 on the bushing throughout the entire circumference simultaneously. Since the bushing is divided into more than two parts there is no necessity of applying the wedging force first in a single plane as is preferable with the embodiment illustrated in Figs. 1 to 6. The opening 333 in the shell and the key 340 are also somewhat differently arranged in this modification. The key 340 is provided with a thin portion 341 of sufficient circumferential length to extend two-thirds of the distance about the bushing so that its down-turned end 342 engages in one of the splits 326, the thickened portion 344 spans another of the splits 326 and the third split 326 is spanned by the thin portion 341 of the key. Thus all of the sections of the bushing are firmly held against axial movement relative to each other.

The opening 333 in the shell is formed with a notch 337 to receive the thickened portion 344 of the key 340 when the stock and bushing are turned in the direction opposite to the normal rotation so that the forward edge 322 of the shell is prevented from engaging the beveled surface 331 on the bushing when it is desired to remove the bar of stock S. The notch 337 terminates in a beveled edge 338 which cooperates with the beveled edge 345 on the key 340 to facilitate removal of the key in the same manner as the beveled edges 38 and 45 in the embodiment disclosed in Figs. 1 to 6 inclusive.

The opening 333 in the shell has its notch 337 spaced from both the rearwardly facing edge 334 and the forwardly facing edge 336 of the opening. Thus when the shell moves on its retracting stroke the thickened portion 344 of the key is seated against the edge 334 and cannot enter the notch 337 by accidental relative rotation between the bushing and the stock in the direction opposite to the normal direction of driving, which might occur from the shell over-running the stock and bushing. Proper positioning of the thickened portion 344 is insured by the fact that the stock is gripped and rotated by the collet during the retracting stroke of the pusher, so that the shoulder 348 on the key is strongly urged against the edge 335 of the opening. At the beginning of the pushing stroke, if it should happen that the collet releases the stock before the shell 320 moves forwardly, the shell cannot over-run and position the thickened portion 344 of the key in the notch 337, and thus lock the wedging surfaces out of engagement. As soon as the shell 320 begins to move forward the notch 337 is moved rapidly past the end of the key and the forward edge 322 engages the wedging surface 331. Any slight relative rotation of the bushing and the shell during the beginning of the forward stroke until the wedging surfaces come into engagement is taken care of my making the edge 336 of the opening slightly longer than the edge 334 so that the key cannot enter the notch during this initial portion of the forward stroke of the pusher.

It will be understood, of course, that the arrangement of the key and the three split bushing illustrated in Figs. 11 to 13 may be used with either a solid shell, as illustrated, or with a split or inwardly tensioned shell, such as that shown in Fig. 9, and likewise that the arrangement of the opening 333 and the notch 337 may be used with any of the other forms of bushings and keys.

Another slightly modified embodiment of the invention is illustrated in Figs. 14 to 17 inclusive.

In this embodiment the shell 420 is formed with two similar oppositely disposed openings 433 arranged to cooperate with a pair of oppositely disposed keys 440. In the particular embodiment illustrated the shell is formed with one split 460 extending from the front face into one of the openings 433 to impart a certain amount of resiliency to the forward end of the shell. The front edge of the shell is formed with wedging surfaces 422, one of which is preferably intersected by the split 460, these wedging surfaces being separated by cut-back portions 423 of the forward edge.

The bushing illustrated in connection with this embodiment is a one-piece bushing comprising the partially separated sections 424 and 425. On one side a slot 426 is cut completely through the length and wall thickness of the bushing, and on the opposite side a slot 426a is cut through the thickness of the wall of the bushing and through the major portion of its length, leaving the two sections 424 and 425 integrally connected by the portion 426b at the end of the slot 426a.

The bushing is formed on its exterior surface with a wedging surface 431. In advance of this wedging surface a ledge 427 may be provided if desired for the reception of a spring. Normally, however, no spring is needed on the bushing since after being constructed it is inwardly tensioned to partially close the slot 426 and the forward end of the slot 426a.

Each of the keys 440 is formed with a thickened portion 444 terminating in a beveled edge 445 for cooperation with the beveled edge 438 of one of the openings 433. In addition each key is formed with a thin portion of substantially the same thickness as the depth of the groove 432 in the bushing, the thin portions 431 terminating in inturned ends 442 arranged to seat in the slots 426 and 426a.

In this embodiment the parts are assembled and operate in the same manner as previously described, except that both of the keys 440 are simultaneously drawn into the space between the bushing and the shell during assembly and the thickened portion 444 of each key engages the edges of its opening 433 so as to apply the retracting force to both sides of the bushing simultaneously. Preferably the two parts 424 and 425 of the bushing are tensioned inwardly only a slight amount adjacent the groove 432 so that they do not move together sufficiently to permit the thickened portions 444 of the keys to escape inwardly from the openings in the shell when no stock is gripped in the bushing. It will be apparent that any desired number of slots and keys may be used in this form of the invention.

A further modified form of my invention is illustrated in Figures 18 to 27 inclusive. In this form the pusher shell 501, as in the embodiments previously described, is provided at its rearward end with threads 503 to fasten the shell to the pusher tube, and is provided at its forward end with a bevelled surface 513. Intermediate its ends the shell is formed with one or more L-shaped cutouts 504 providing both forward and lateral abutment surfaces for cooperation with the bushing 502.

As illustrated the bushing 502 is divided into three segmental portions 505 by longitudinal cuts 506. At its forward end the bushing is provided with a thickened portion 516, the outer surface of which is bevelled at a small angle as indicated at 517. The thickened portion 516 may be knurled to facilitate handling the same to remove the bushing.

The sections 505 of the bushing are preferably turned down at spaced points, leaving circumferential outwardly projecting ribs 507, 508 and 509. An annular spring 510 is seated between the ribs 507 and 508 and an annular spring 511 is seated between the ribs 508 and 509.

The bushing is provided with one or more milled slots 518 extending longitudinally and arranged to receive a key 519. As illustrated three slots 518 are provided and are located so that they are cut through by the slots 506 which divide the bushing into three parts.

Each key 519 is rockably seated in a slot 518 and is formed at one end with an extension 520 passing under the spring 510 and at the other end with an outwardly projecting head 521. The extension 520 is formed with a notch 522 receiving and fitting the spring 510, so that the keys are locked in their proper position by the spring.

The head 521 of each key 519 projects outwardly a slight amount beyond the outer surface of the bushing 502 and is positioned in one of the L-shaped cutouts 504 formed in the shell 501. The heads 521 of the keys 519 are normally positioned in the portions of the cutouts 504 having the greater axial length, as illustrated in Figure 23. In this position the keys 519 permit axial movement of the bushing with respect to the shell, and when the shell moves forwardly permit the tapered surfaces 517 to be wedged inwardly to tightly grip the stock by engagement with the bevelled surface 513 at the forward end of the shell. In normal operation the stock is rotated in a clockwise direction as seen from the rear end of the spindle, so that the head ends 521 of the keys remain in the portions of the cutouts 504 having the greater axial length and prevent relative rotation of the bushing and the shell. When it is desired to withdraw the bar from the pusher the bar is pushed forwardly and turned in a counterclockwise direction so as to seat the head ends 521 of the keys 519 in the portions of the cutouts 504 having the shorter axial length. In this position, as illustrated in Figure 27, the heads 521 prevent relative axial movement of the shell and bushing and thereby prevent wedging engagement of the tapered surface 517 and bevelled surface 513.

When the bar is removed from the pusher the sections 505 of the bushing collapse inwardly the amount permitted by the slots 506. This collapsing movement would be sufficient to permit the heads 521 of the keys 519 to escape from the cutouts 504 if the keys were rigidly mounted on the bushing. However, when the bushing collapses, the extensions 520 of the keys 519 are likewise pressed inwardly by the tension of the spring 510, forcing the heads 521 of the keys radially outward so that they remain engaged in the cutouts 504.

To permit removal of the bushing from the shell the head ends 521 of the keys are formed on one side with bevelled surfaces 523. When the stock is removed from the bushing the forward thickened portion 516 of the bushing 502 may be grasped and the bushing rotated in the shell so as to turn the heads 521 into the short portions of the cutouts 504, and further rotated to engage the bevelled surfaces 523 with the edges of the cutouts 504 and force the head ends 521 of the keys radially inward against the tension of the spring 510. When this is done the keys clear the inner surface of the shell 501 and the bushing may be withdrawn from the shell.

Although several embodiments of the invention have been described in considerable detail, it is to be understood that the invention is not limited to the particular features or the particular combinations of features disclosed. For example, the type of key illustrated in Fig. 7 made from a single strip of material may be utilized in any of the embodiments shown. Similarly, the different forms of bushings may be used with other forms of shells other than those in connection with which they are described. Many of the features are likewise applicable to different types of assemblies.

I claim:

1. A pusher comprising a shell, a bushing adapted to grip stock to be fed disposed within said shell, cooperating wedging means on said shell and bushing arranged to increase the grip of said bushing on the stock when said shell moves forwardly with respect to said bushing, said shell being formed with an opening through the wall thereof, abutment means carried by said bushing and projecting into said opening, said abutment means being arranged to engage one edge of the opening in said shell to move said bushing rearwardly when said shell moves rearwardly, and said abutment means being arranged to engage another edge of the opening to restrain relative rotation of said shell and bushing in one direction.

2. A pusher comprising a shell, a bushing adapted to grip stock to be fed disposed within said shell, cooperating wedging means on said shell and bushing arranged to increase the grip of said bushing on the stock when said shell moves forwardly with respect to said bushing, said shell being formed with an opening through the wall thereof, abutment means carried by said bushing and projecting into said opening, said abutment means being arranged to engage one edge of the opening in said shell to limit relative rotation of said shell and bushing in one direction, said opening being formed with a notch opposite said one edge adapted to receive said abutment means upon relative rotation of said shell and bushing in the opposite direction to prevent engagement of said wedging means.

3. A pusher comprising a shell, a bushing adapted to grip stock to be fed disposed within said shell, cooperating wedging means on said shell and bushing arranged to increase the grip of said bushing on the stock when said shell moves forwardly with respect to said bushing, said shell being formed with an opening through the wall thereof, abutment means carried by said bushing and projecting into said opening, said abutment means being arranged to engage one edge of the opening in said shell to move said bushing rearwardly when said shell moves rearwardly, said abutment means being arranged to engage another edge of the opening to limit relative rotation of said shell and bushing in one direction and said opening being formed with a notch opposite said last mentioned edge adapted to receive said abutment means upon relative rotation of said shell and bushing in the opposite direction to prevent engagement of said wedging means.

4. A pusher comprising a shell, a bushing adapted to resiliently grip the stock to be fed disposed within said shell, said shell being formed with an opening spaced rearwardly from its forward edge and said bushing being formed with a recess arranged to register in an axial direction with said opening when said bushing is assembled in operative position within said shell, and a key engaged with said bushing, said key including a portion adapted to be disposed in the recess in said bushing and beneath the wall of said shell and a portion adapted to project from said bushing into the opening in said shell.

5. A pusher comprising a shell, a bushing adapted to resiliently grip the stock to be fed disposed within said shell, said shell being formed with an opening spaced rearwardly from its forward edge and said bushing being formed with a recess arranged to register in an axial direction with said opening when said bushing is assembled in operative position within said shell, and a key adapted to be inserted through said opening and engaged with said bushing in one relative circumferential position of said bushing and shell, said key including a portion adapted to be disposed in the recess in said bushing and drawn beneath the wall of said shell upon relative rotation of said bushing and shell in one direction from said first-mentioned position, and said key including a portion adapted to project from said bushing into the opening in said shell.

6. A pusher comprising a shell, a bushing adapted to resiliently grip the stock to be fed disposed within said shell, said shell being formed with an opening spaced rearwardly from its forward edge and said bushing being formed with a recess arranged to register in an axial direction with said opening when said bushing is assembled in operative position within said shell, and a separate key adapted to be inserted through said opening and engaged with said bushing in one relative circumferential position of said bushing and shell, said key including a portion adapted to be disposed in the recess in said bushing and drawn beneath the wall of said shell upon relative rotation of said bushing and shell in one direction from said first-mentioned position, and said key including a thickened portion adapted to be moved into position to project from said bushing into the opening in said shell by such rotation, said thickened portion having a surface adapted to engage an edge of said opening to limit rotation in said one direction, and having an oppositely disposed cam surface adapted to engage an edge of said opening and lift said thickened portion out of the recess in said bushing upon relative rotation of said bushing and shell in the opposite direction.

7. A pusher comprising a shell, a bushing divided into separate segments disposed within said shell, a spring surrounding the segments of said bushing to urge the same inwardly upon stock to be fed, inter-engaging abutments on said shell and bushing spaced axially from said spring, the meeting edges of said segments being beveled from one end of said bushing inwardly to a point adjacent said spring, whereby when no stock is disposed within the bushing the tension of said spring urges the beveled edges of said segments toward each other and urges the portion of said bushing carrying said abutments radially outward against said shell.

8. A pusher comprising a shell, a bushing divided into separate segments disposed within said shell, a spring surrounding the segments of said bushing to urge the same inwardly upon stock to be fed, inter-engaging abutments on said shell and bushing spaced axially from said spring, the meeting edges of said segments being flared outwardly away from each other from a point adjacent said spring to one end of said bushing whereby when no stock is disposed within the bushing the tension of said spring urges the beveled edges of said segments toward each other and urges the portion of said bushing carrying said abutments raidally outward against said shell.

9. A pusher comprising a shell, a bushing divided into separate segments disposed within said shell, a spring surrounding the segments of said bushing to urge the same inwardly upon stock to be fed, cooperating wedging means on said shell and bushing arranged to increase the grip of said bushing on the stock when said shell moves forwardly with respect to said bushing, abutments on said shell and bushing spaced axially from said spring and arranged to engage when said shell moves rearwardly, the meeting edges of said segments being flared outwardly at one end of said bushing whereby when no stock is disposed within the bushing the tension of said spring urges the beveled edges of said segments toward each other and urges the portion of said bushing carrying said abutments radially outward against said shell.

10. A pusher comprising a shell, a bushing divided into separate segments disposed within said shell, a spring surrounding the segments of said bushing to urge the same inwardly upon stock to be fed, said shell being formed with an opening through the wall thereof, abutment means on said shell and bushing spaced axially from said spring, the meeting edges of said segments being beveled outwardly away from each other from one end of said bushing inwardly to a point adjacent said spring whereby when no stock is disposed within the bushing the tension of said spring urges the beveled edges of said segments toward each other and urges the portion of said bushing carrying said abutments radially outward against said shell.

11. A pusher comprising a shell, a bushing adapted to grip stock to be fed disposed partially within said shell, one end of said bushing projecting from said shell and formed with a wedging surface cooperating with the end of said shell to increase the grip of said bushing on the stock when said shell moves forwardly with respect to said bushing, said shell being formed with an opening through the wall thereof, abutment means carried by said bushing and projecting into said opening, said abutment means being arranged to engage one edge of the opening in said shell to move said bushing rearwardly when said shell moves rearwardly, and said abutment means being arranged to engage another edge of the opening to restrain relative rotation of said shell and bushing in one direction.

12. A pusher comprising a shell, a bushing adapted to grip stock to be fed disposed partially within said shell, one end of said bushing projecting from said shell and formed with a wedging surface cooperating with the end of said shell to increase the grip of said bushing on the stock when said shell moves forwardly with respect to said bushing, said shell being formed with an opening through the wall thereof, abutment means carried by said bushing and projecting into said opening, said abutment means being arranged to engage one edge of the opening in said shell to move said bushing rearwardly when said shell moves rearwardly, and said abutment means being arranged to engage another edge of the opening to restrain relative rotation of said shell and bushing in one direction, the end of said shell being slotted and formed to contract upon said bushing.

13. A pusher comprising a shell, a bushing adapted to grip stock to be fed disposed within said shell, cooperating wedging means on said shell and bushing arranged to increase the grip of said bushing on the stock when said shell moves forwardly with respect to said bushing, said shell being formed with an opening through the wall thereof, abutment means carried by said bushing and projecting into said opening, said abutment means being arranged to engage one edge of the opening in said shell to move said bushing rearwardly when said shell moves rearwardly, and said abutment means being arranged to engage another edge of the opening to restrain relative rotation of said shell and bushing, said abutment means being constructed so as to be resiliently pressed radially outward and to be yieldable inwardly to permit removal of said bushing from said shell.

14. A pusher comprising a shell having a circumferentially continuous forward edge, a bushing adapted to grip stock to be fed disposed within said shell, cooperating wedging means on said shell and bushing arranged to increase the grip of said bushing on the stock when said shell moves forwardly with respect to said bushing, said shell being formed with an opening through the wall thereof, abutment means carried by said bushing and projecting into said opening, said abutment means being arranged to engage one edge of the opening in said shell to move said bushing rearwardly when said shell moves rearwardly, and said abutment means being arranged to engage another edge of the opening to restrain relative rotation of said shell and bushing, said abutment means being constructed so as to be resiliently pressed radially outward and to be yieldable inwardly to permit removal of said bushing from said shell.

15. A pusher comprising a shell, a bushing adapted to grip stock to be fed disposed within said shell, cooperating wedging means on said shell and bushing arranged to increase the grip of said bushing on the stock when said shell moves forwardly with respect to said bushing, said shell being formed with an opening through the wall thereof, abutment means carried by said bushing and projecting into said opening, said abutment means being arranged to engage one edge of the opening in said shell to move said bushing rearwardly when said shell moves rearwardly, said abutment means having a beveled side to engage another edge of the opening to resist relative rotation of said shell and bushing in one direction, said abutment means being constructed so as to be radially yieldable and arranged to be pressed out of said opening and into said shell upon forced relative rotation of said shell and bushing in said one direction.

STODDARD B. MARTIN.